June 10, 1941.  W. E. HORROCKS  2,245,196
THRUST FLANGE FOR ANTIFRICTION BEARINGS
Filed May 1, 1939   2 Sheets-Sheet 2
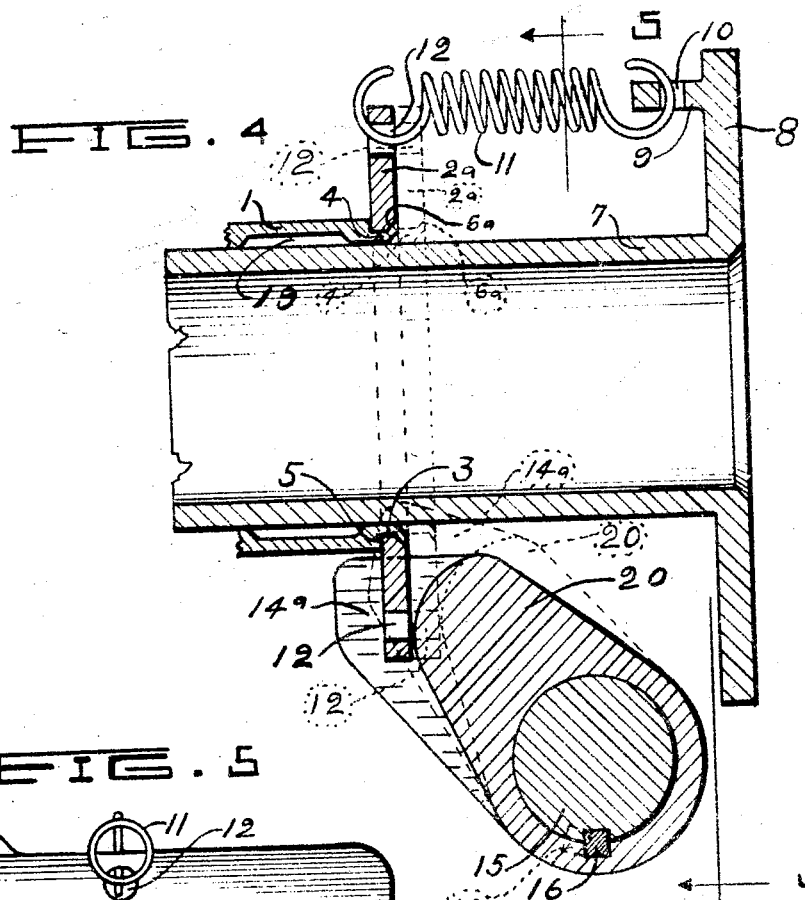
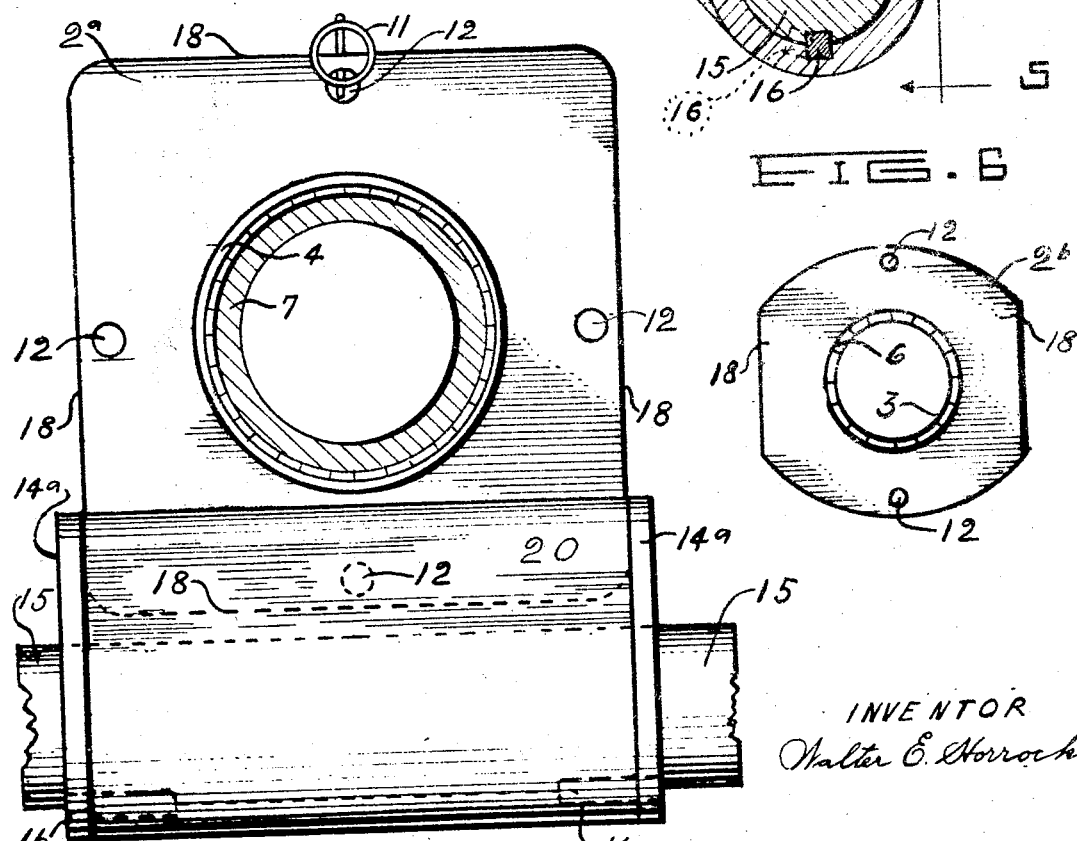
INVENTOR
Walter E. Horrocks
WITNESSES Patented June 10, 1941

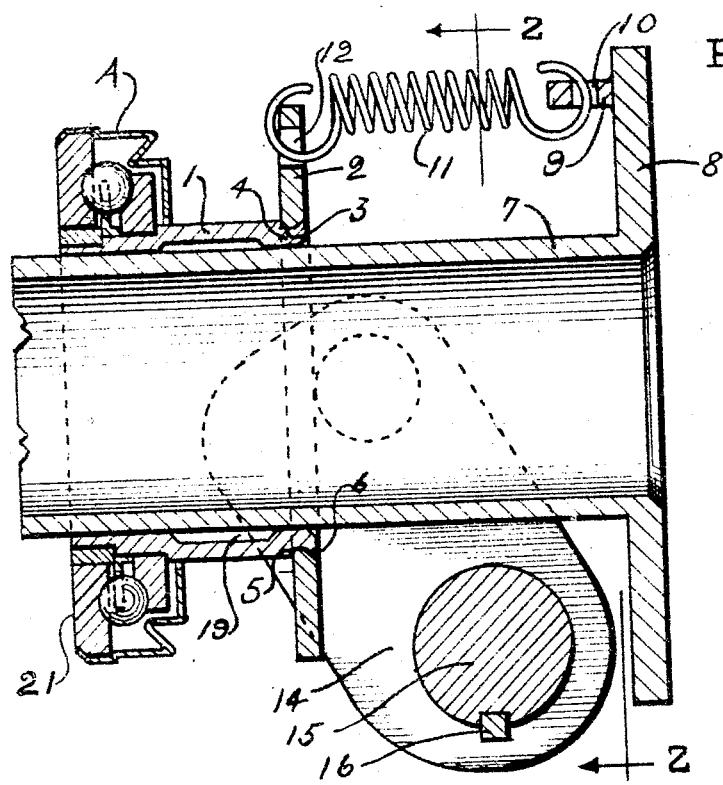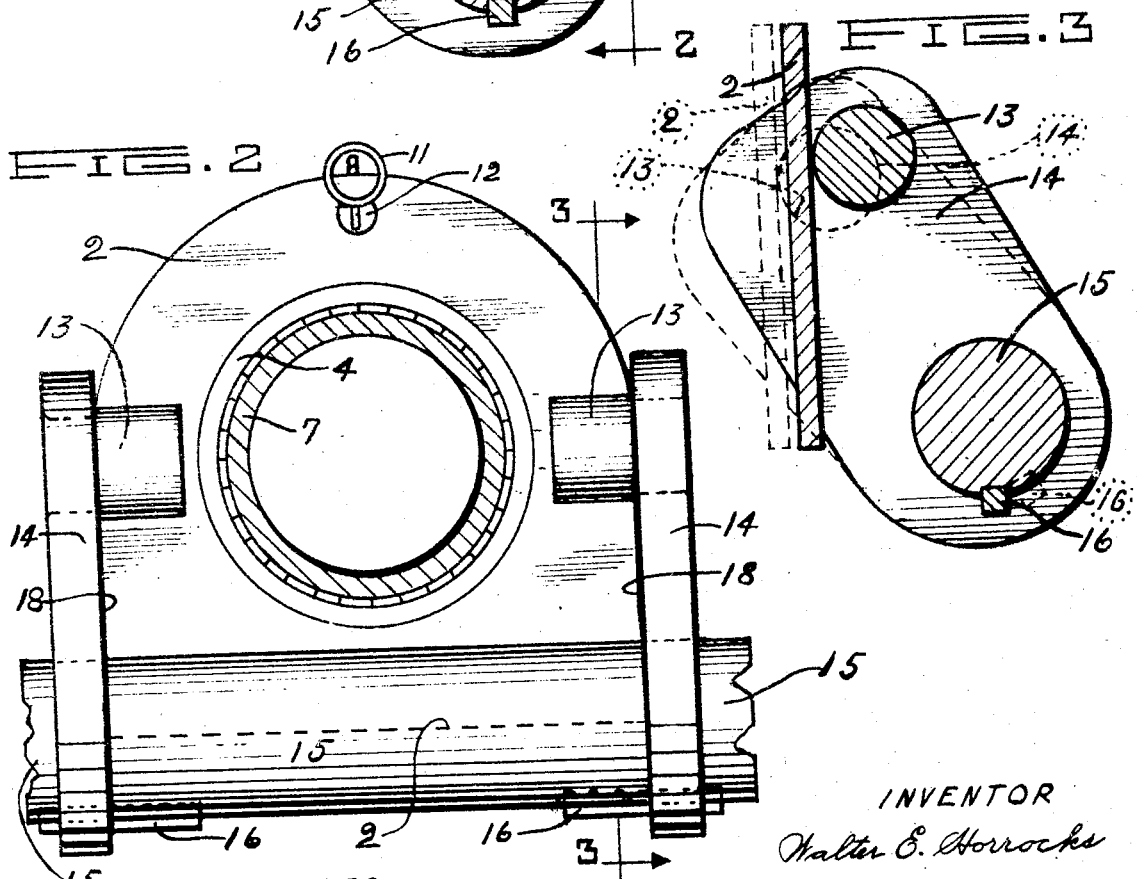

2,245,196

UNITED STATES PATENT OFFICE 2,245,196

THRUST FLANGE FOR ANTIFRICTION BEARINGS

Walter E. Horrocks, Lakewood, Ohio

Application May 1, 1939, Serial No. 270,966

3 Claims. (Cl. 308—233)

My invention relates to simplified improvements in thrust flanges for use with antifriction bearings preferably of the thrust type which have sliding retractive movement, and has for its primary object to provide a one piece thrust flange that can be economically manufactured by the standard stamping press method by which: One stroke of the stamping press will fabricate a thrust element from variable thicknesses of metal in a finished form which is suitable for hardening and grinding without additional stamping press operations or any additional subsequent operations to prepare the flange for assembling to the bearing.

One of the objects of my invention is to provide a one piece thrust flange in which the metal can be selected of a suitable thickness for any required heat treatment and any extensive grinding operations necessary to produce a smooth finish over the entire surfaces and the sides that contact the retractive mechanism.

Another object is to provide a one piece thrust flange in which the working surfaces and the sides that are adjacent to the retractive mechanism can be turned around so that the thrust flange has the advantage of using interchangeable working parts in, one, two, three, or four different positions.

A further object is to provide a thrust flange having a perfectly smooth overall flat surface and sides which are adaptable for universal contact with a retractive mechanism to better eliminate any torsional strains on the antifriction bearing assembly.

With the above and other objects in view I have shown the invention in connection with a separating race ring thrust bearing enclosed in a lubricant retaining casing as described in my pending patent applications Serial No. 218,286 filed July 9, 1938, now matured into Patent No. 2,173,508, issued Sept. 19, 1939, which describes the former and Serial No. 222,351 filed August 1, 1938, now matured into Patent No. 2,241,032 issued May 6, 1941, which describes the latter, but it is understood that the application of this thrust flange can be embodied into other types of antifriction bearings than what are shown in this application, referring specifically to the drawings in which:

Fig. 1 is a view principally in central section illustrating the thrust flange attached to an antifriction bearing having sliding movement on a carrier and in cooperation with a retractive stud means.

Fig. 2 is a section on line 2—2 of Fig. 1 showing the retractive mechanism in relation to the thrust flange.

Fig. 3 is a section on line 3—3 of Fig. 2 showing the thrust flange in relation to the studs of the retractive mechanism.

Fig. 4 is a view in longitudinal vertical section of a modified thrust flange applied to the sliding sleeve of a thrust bearing mounted on a carrier and in cooperation with a retractive cam means.

Fig. 5 is a section on line 5—5 of Fig. 4 showing the retractive cam mechanism in relation to the thrust flange.

Fig. 6 is a face view of an alternative thrust flange.

The dotted lines shown in Fig. 3 and Fig. 4 indicates the retractive movement of the thrust flange in conjunction with the retractive mechanism.

In a bearing with its immediate associated elements such as is used for automobile clutch release, which I have shown in the drawings as being typical of the application of my improved thrust flange, the antifriction bearing assembly A has an extended sleeve section 1 upon the end of which the thrust flange 2 is secured by press fitting the bore 3 of the thrust flange 2 over the reduced end 4 of the antifriction bearing sleeve 1 against a shoulder 5 which is formed on the sleeve 1, and then press fitting or swagging the reduced end 4 of the sleeve 1 into the countersunk end 6 of the bore 3 in the thrust flange 2 which securely fastens the thrust flange 2 to the antifriction bearing A thus enabling the assembled unit to be installed around the carrier 7 or any other suitable carrying means for sliding movement.

The carrier 7 preferably has a flange 8 adapted for attachment to other supporting elements in which a lug 9 or any other suitable means is provided having a hole 10 for the attachment of one end of a spring 11 in which the opposite end of the spring 11 is attached to the thrust flange 2 through a hole 12 which is punched through the outer edge of the thrust flange 2. The spring 11 keeps the thrust flange 2 pressed against the two studs 13, or the cam 20 as the case may be. The studs 13 are attached to the brackets 14 substantially as shown with the brackets 14 being keyed to a retractive shaft member 15 by the keys 16 as shown.

It is understood that the retractive shaft 15 is mounted to other elements by any practical mounting means that are suitable for each individual application as this invention pertains to the thrust flange and its immediate contacting retractive elements. The shaft supporting means may be of any of the well known methods of the art pertaining to these means, and a lever can also be attached to the shaft 15 and a spring attached to the lever so that the tension on the spring is transmitted to the lever and through the shaft 15 to the brackets 14, or the flanges 14a as the case may be. This will restrain the studs 13 or the cam 20 from exerting any working pressure against the thrust flange until a pressure is applied to the lever which will cause the shaft 15 to rotate and move the attached brackets 14, or the flanges 14a so that the studs 13, or the cam 20 as the case may be, will be thrust against the face of the thrust flange 2 or 2a which then places the antifriction bearing assembly under a working load such as when the outer face 21 of the opposing race ring bearing assembly A contacts the levers of a conventional clutch mechanism or other opposing elements.

The brackets 14, or the flanges 14a as the case may be, being spaced parallel on the shaft 15 overlap the sides 18 of the thrust flange 2, or 2a and prevents the antifriction bearing A from any rotatable movement around the carrier 7 while allowing of a sliding retractive movement of the sleeve 1 on the carrier 7. The retractive brackets 14 or the retractive flanges 14a as the case may be, by overlapping the outer sides of the thrust flange results in counteracting any twisting torsional strain that is imposed upon the thrust flange such as when the opposing elements that contact the outer face 21 of the opposing race ring, contacts the face 21 close to the outer periphery which results in creating a greater twisting torsional effect than is created as when the opposing elements contact the outer face 21 of the opposing race ring close to the bore hole, or close to the center axis of the assembled unit.

It is to be noted that the studs 13 are shown contacting the thrust flange 2 on the center axis line of the carrier and the antifriction bearing, but the contact points of the studs may be varied either up or down relative to the axis line by modifying the length of the brackets 14 and in which the thrust flange shown in Fig. 6 may be substituted instead of the thrust flange shown in Figs. 1 and 2. This will permit the advantages of revolving the thrust flange 2b around the carrier 7 so as to present different interchangeable working points of contact between the studs 13 which can be placed off the center line of the antifriction bearing assembly A if so desired.

The recessed section 19 on the inner side of the sliding sleeve 1 can be packed with a suitable non fluid lubricant, or other means can be provided for injecting lubricant from the exterior side of the sleeve if so desired.

Figures 4 and 5 show a modified form of thrust flange and retractive mechanism which employ a retractive cam 20 which has a continuous line contact with the thrust flange 2a extending across the face of the thrust flange.

The thrust flange 2a being made square with slightly rounded corners and having four holes 12 punched through the edges to attach the spring 11 allows the thrust flange 2a to be revolved around the carrier 7 to present four different line bearing points of contact with the cam 20, in which the sides 18 are interchangeable between the flanges 14a when the thrust flange 2a is revolved around the carrier 7 to obtain the different line bearing points of contact with the cam 20.

The flanges 14a and the cam 20 are secured to the shaft 15 by means of keys 16 as shown with the flanges 14a overlapping the sides 18 of the thrust flange 2a as shown. The advantage of this arrangement is that the cam 20 having a continuous line contact with the thrust flange 2a extending to each side 18 of the thrust flange 2a eliminates any side twisting torsional effect upon the entire assembly of the sliding antifriction bearing and thrust plate.

The aforesaid side twisting torsional effect will be apparent if the brackets 14 or the studs 13 shown in Figures 1, 2 and 3 are not properly aligned and one of the studs 13 contacted the thrust plate 2 slightly in advance of the complementary stud when a heavy working pressure is applied to the thrust flange.

Referring to prior art structures such as shown in the Patent No. 1,668,668 issued May 8, 1929 to Frank Beemer and Patent No. 2,121,418 issued June 21, 1938 to T. Barish for use in automobile clutch release, employ thrust elements that are to be manufactured from comparatively thin sheet metal stock, in which the thrust element has pressed or bent portions forming projections or bosses for sliding contact engagement with a retractive mechanism.

With standard stamping press equipment, the manufacture of structures such as are disclosed in the above references require a multiple number of dies to produce the finished product, such as a blanking die for cutting out the required disk from the sheet stock preparatory to the subsequent stamping operations, a drawing die for drawing the stamped disk into its initial formation, a redrawing die for the final pressing of the initial shaped stamping into its final structural shape, and a trimming die for trimming the surplus stock from around the edges of the finished stamped element.

This requirement together with the multiple number of stamping press operations that are required to produce a finished unit, involves an expensive initial cost for the numerous dies, and an expensive production cost which is required by the multiple number of stamping press operations necessary to produce the finished unit.

The finished product being made of thin sheet metal, restricts the hardening process of the bosses or flanges to case hardening or cyaniding, but by its thinness the product is unsuitable for any extensive grinding operations for producing a perfectly smooth contacting surface for engagement with the retractive mechanism for neutralizing any constant frictional wear between its coacting parts.

It is to be further noted that the structures shown in the references require that they be formed with a drawing die operation, and to be practically manufactured by the stamping press method are limited to the gage thickness of the stock which should be from 24 gage to 20 gage, and possibly 18 gage stock would be the limit of thickness to successfully draw the element into their finished shape.

From the antecedent description of the invention over the references the operation of the invention will be apparent and allows of the thrust flange to be economically fabricated with one stroke of a stamping press in which sheet metal stock is selected of the proper required width and fed through a progressive die, the design of the die being made so that the center bore hole and the small holes for attaching the spring element are punched through the stock at the same time, and then as the stock is pushed progressively between the second section of the progressive die, a pilot punch engages the center bore hole that is punched in the stock, and then the outside contour (or the width of the flange as the case may be) of the thrust flange is sheared off from the strip stock. The engaged pilot punch has an offset shoulder connected integrally with the pilot punch by a slightly tapered fillet which engages the periphery of the bore hole in the flange that has been sheared from the strip stock.

The fillet presses the thrust flange against a bottom die which has a slightly countersunk hole into which the tapered fillet on the pilot punch squeezes the metal (which is known to the art as coining), and forms a counter-sink around the bore of the center hole in the thrust flange, which allows the sleeve of the antifriction bearing to be firmly fixed on the thrust collar as described.

After the first stroke of the stamping press which punches the center bore hole including the small holes for the attachment of the spring element, each stroke of the stamping press thereafter will produce one thrust flange as the strip stock is pushed progressively forward through the progressive die set.

The thickness of stock that can be used for the thrust plate in my invention is practically unlimited, as the gage of the metal can be selected to suit any requirement. In the manufacture of a plate thrust flange as described the thickness of stock from which the thrust flange is to be fabricated can be selected of severable variable thicknesses consisting of either oversize or undersize stock which can be fabricated with the same progressive die set.

This variation is made possible by the simplified flat design of the thrust flange which is disclosed in this invention, and in which the advantageous features are unattainable in sheet metal structures which are designed with flowing contours as are shown in the references. In such structures the dies have to be made to form and draw the elements from stock of a predetermined selected set thickness and the dies have to be made to conform to manufacturing elements from the one selected thickness, due to the fact that the different thicknesses of metal require that different allowances must be made for each thickness of the metal when making dies that are to be used for drawing purposes. Drawing dies which are designed for one thickness of metal are useless to fabricate metal of either oversize or undersize thickness.

The design of the flat thrust flange also allows of the thrust flange to be manufactured by the aforesaid described method from comparatively hard tempered or tough stock, such as stainless steel and the like, in which the hardening process of the finished product may be eliminated, and the variable interchangeable parts of the thrust flange can be utilized, such as when one working position of the flange becomes excessively worn, the thrust flange can be turned around to present different unused wearing surfaces for contact with the retractive mechanism, and rearranging the positions of the sliding sleeve of the bearing around the carrier, which presents different positions in the bearing sleeve for receiving any side twisting tortional stresses that would be present if the retractive stud means contacted one side of the thrust plate in advance of the complementary stud, all of which prolongs the life of the entire assembled unit such as when used in an automobile clutch release mechanism.

It is to be noted that in addition to the improvements enumerated above, the flat thrust flange without any changes, can be utilized for a pull type of clutch release arrangement in lieu of the push type which is shown, by simply rearranging the position of the thrust flanges so that they will contact the thrust stud means on the opposite side of the plate to what is shown, and this rearrangement can also be applied to the cam thrust means which may be secured entirely to and between the overlapping flange elements, so as to contact the flat thrust plate on the opposite side to what is shown, as this rearrangement is made possible by the overlapping bracket elements with their attached thrust means.

Having described my invention, it is obvious that slight modifications can be made in the contour of the thrust flange, and the design of the retractive mechanism without departing from the spirit and the scope of the invention, and what I claim and desire to secure by Letters Patent is:

I claim:

1. In a thrust bearing mechanism, the combination of a pair of bracket elements secured to and co-axially spaced on a retractive shaft member, thrust elements secured to said brackets and means providing a unitary thrust flange between said brackets and in contact with said thrust elements comprising a flat plate member having diametrically parallel sides in line contact with said brackets and being secured to the slideable sleeve of an antifriction bearing substantially as described.

2. In a thrust bearing mechanism, the combination of a pair of flange elements secured to and co-axially spaced on a retractive shaft member, a thrust element secured between said flange elements and means providing a unitary thrust flange between said flange elements and in contact with said thrust element comprising a flat plate member having diametrically parallel sides in line contact with said flange elements and being secured to the slideable sleeve of an antifriction bearing substantially as described.

3. In a thrust bearing mechanism, the combination of a pair of bracket or flange elements secured to and co-axially spaced on a retractive shaft member, thrust elements between the bracket or flange elements and means providing a unitary thrust flange between said bracket or flange elements and in contact with said thrust elements comprising a flat plate member having diametrically parallel sides in line contact with said bracket or flange elements and being secured to the slideable sleeve of an antifriction bearing substantially as described.

WALTER E. HORROCKS.